Figure 1:
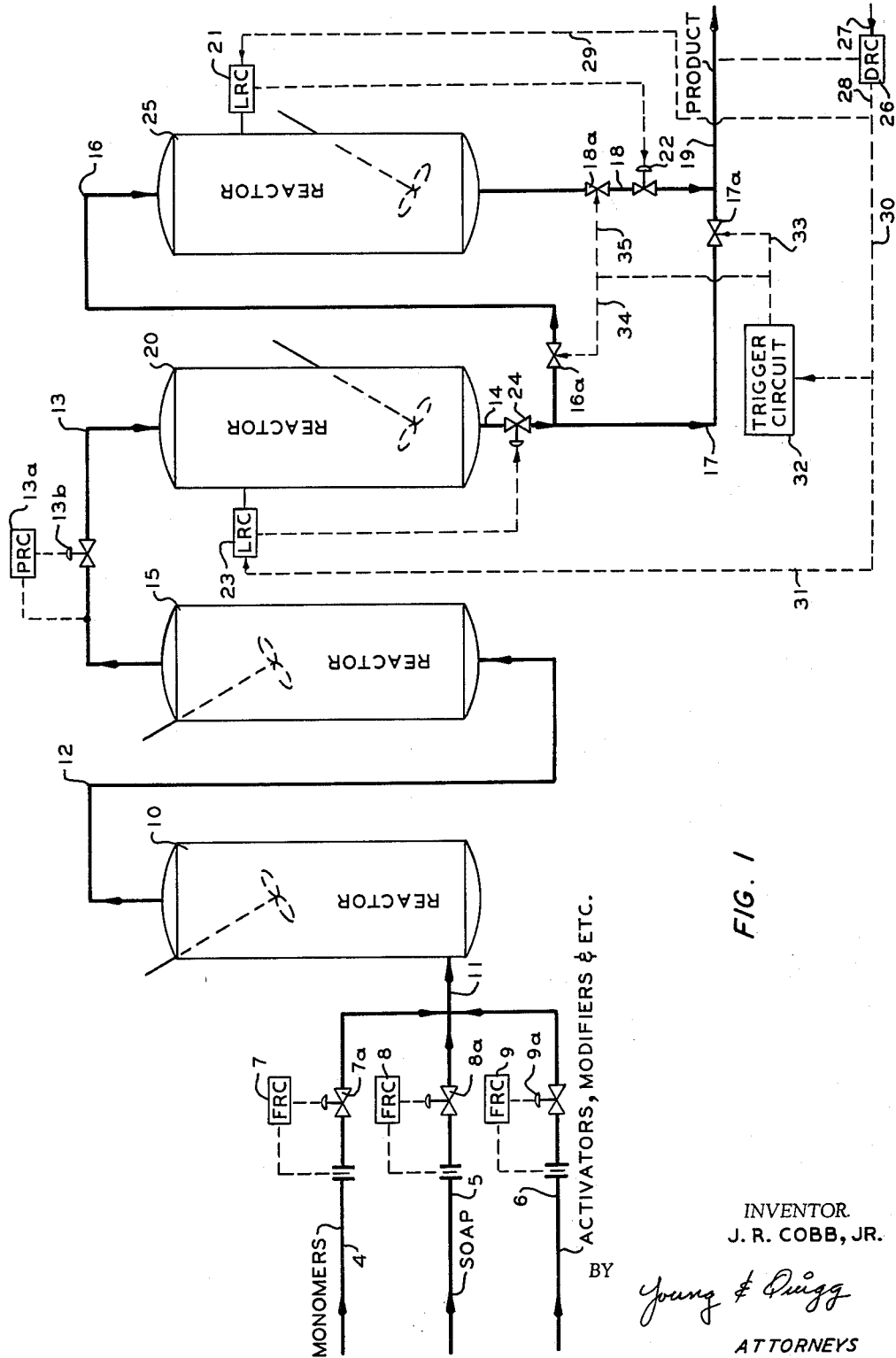

INVENTOR.
J. R. COBB, JR.
BY Young & Quigg
ATTORNEYS

INVENTOR.
J. R. COBB, JR.
BY
Young & Quigg
ATTORNEYS

United States Patent Office 3,255,161
Patented June 7, 1966

3,255,161
CONTROL OF CONVERSION IN REACTION TRAIN
Joseph R. Cobb, Jr., Bartlesville, Okla., assignor to Phillips Petroleum Company, a corporation of Delaware
Filed June 10, 1963, Ser. No. 286,665
11 Claims. (Cl. 260—83.7)

This invention relates to the control of a process. In one aspect, it relates to a method and apparatus for monitoring and/or controlling the liquid level in a reaction zone responsive to the degree of conversion in a process. In a further aspect, it relates to a method and apparatus for controlling the degree of conversion of a monomer or monomers to a polymer, especially rubbery polymers such as polymers of 1,3-butadiene formed in emulsion or solution systems in a continuous exothermic catalytic polymerization process carried out in a plurality of reactors operated in series.

More specifically, the present invention relates to a polymerization process carried out in a plurality of reactors operated in series wherein the liquid level in the downstream reactor(s) is varied to control residence time, hence conversion, and wherein predetermined liquid level of the downstream reactor is reset or adjusted in response to a conversion measurement such as by density of effluent from the last operating reactor in the series.

There is a continuing effort in the chemical and allied industries to develop and exercise more effective and accurate control in various processes with regard to the degree of conversion of reactants to reaction products and the properties thereof. This is particularly true of continuous exothermic processes carried out in the liquid phase in a plurality of reactors operated in series. It is this type of process that is the primary concern of the invention. In such a process, incremental or distinct conversion of reactant or feed to product occurs in each of the reactors as the reaction mixture is passed seriatim from one reactor to another. Usually only a portion of the reactant in such a process undergoes chemical reaction, that is, the total conversion of reactant to end product is less than 100 percent. For efficient operation of such a reactor train and in order to produce a product having uniform properties and a minimum of off-specification product, it becomes necessary to monitor and/or control the degree of conversion in the reactor train and the nature of the accumulated product as the reaction progresses through the reactor train.

Accordingly, an object of this invention is to control the reaction time of a process carried out in a reaction zone.

Another object of this invention is to provide an improved method or apparatus for monitoring and/or controlling the degree of conversion of a reactant mixture to reaction product and the properties thereof in an exothermic process carried out in the liquid phase.

Another object is to provide a method and/or apparatus for controlling the degree of conversion of reactant(s) to rubbery polymer in a continuous catalytic polymerization process carried out in the liquid phase in a plurality of reactors operated in series.

A further object is to maintain a susbtantially constant degree of conversion of reactant to reaction product at full plant capacity in a process carried out in a series of reactors.

Figure 2:
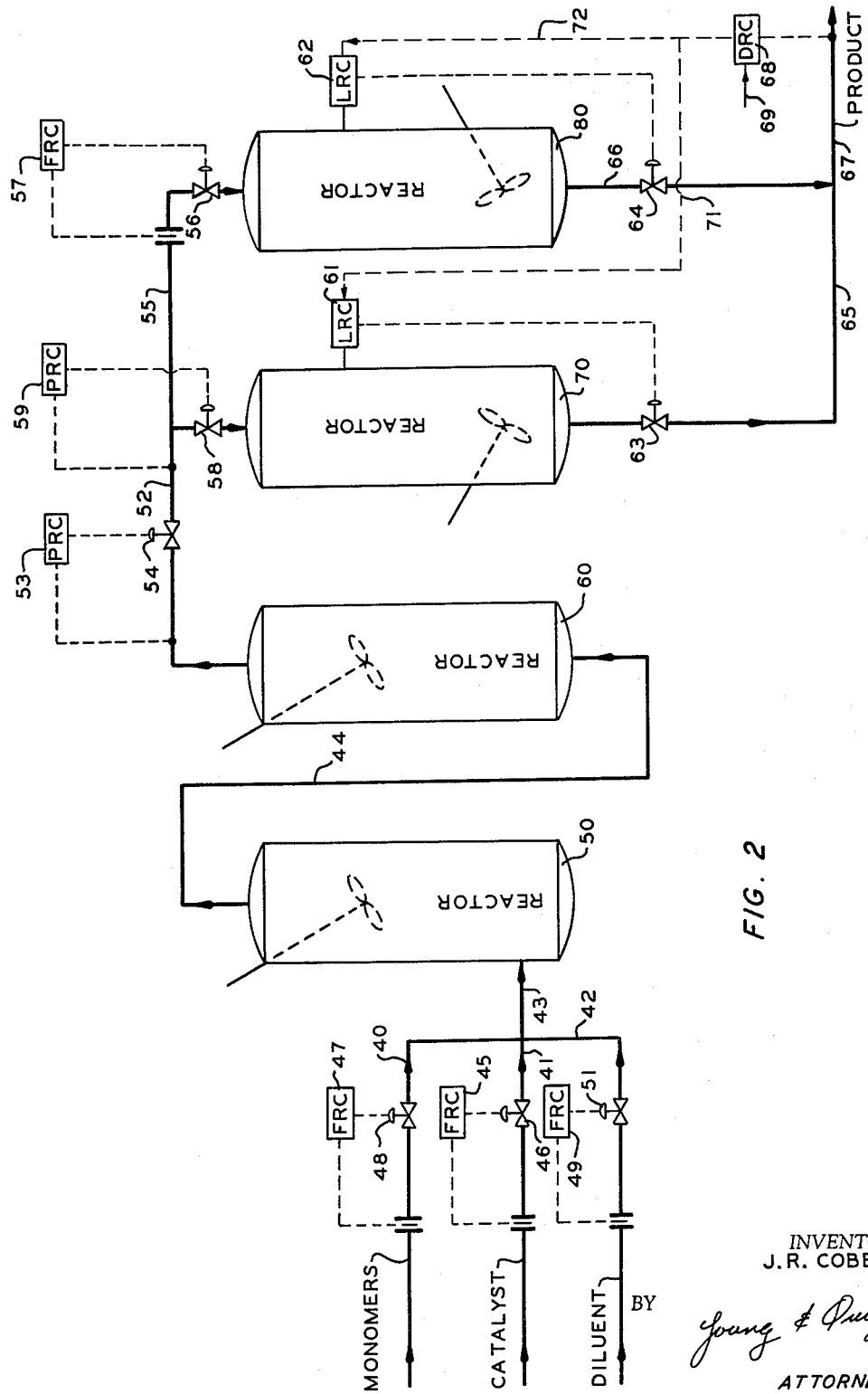

Further objects and advantages of this invention will become apparent to those skilled in the art from the following discussion, appended claims and accompanying drawings wherein:

FIGURE 1 illustrates a schematic flow diagram of one preferred embodiment of the invention wherein a polymerization process is carried out in a plurality of reactors operated in series and controlled in accordance with this invention, namely the emulsion polymerization of monomers such as butadiene and styrene to produce a butadiene-styrene rubber with the novel features of this invention associated therewith; and FIGURE 2 illustrates another preferred embodiment of the invention wherein solution polymerization of a monomer such as butadiene is effected in a plurality of reactors operated in series with the last two reactors in the series being operated in parallel and the liquid level in the reactors is controlled in accordance with this invention.

Broadly stated, this invention contemplates controlling and/or varying the liquid level in a reaction zone responsive to the degree of conversion of reactants to product to control residence time of reactants in the reaction zone and hence conversion. More specifically, the invention contemplates controlling the liquid level in one or more reactors in a reactor train responsive to the degree of conversion of the reactants being reacted to control residence time and conversion of reactants passing through the reactor train. Thus, the desired liquid level in a reactor(s) is adjusted or manipulated responsive to the degree of conversion actually being achieved in the reactor(s).

Further according to the invention, adjustment of the liquid level(s) in the downstream reactor(s) in a reactor train is accomplished in response to a conversion measurement, e.g., density of the effluent containing reaction product removed from the reactor train. Thus, according to the invention, the liquid level of the last reactor(s) in a series is varied to control effective reactor volume, and hence residence time, of the reaction mixture being passed through the reactor train.

Since this invention finds particular utility in conjunction with polymerization processes wherein only a portion of the reactant feed is converted to end product, such as the catalytic polymerization of olefins, e.g., butadiene to cis-1,4-polybutadiene in a solution system, and butadiene and styrene to rubbery butadiene-styrene products in emulsion systems, this invention will be described hereinafter in detail as applied to such processes. However, the invention is not to be unduly limited thereto since it finds special application in any process in which a continuous reaction is carried out in the liquid phase in a plurality of reactors operated in series, including other polymerization processes, e.g., the polymerization of 1-olefins such as ethylene, propylene, etc., and such other processes as alkylation, hydrogenation, isomerization, etc.

Reference will now be made to the accompanying drawing, and initially to FIGURE 1, where a process for the emulsion polymerization of butadiene and styrene to a copolymer of butadiene and styrene is illustrated together with the novel control features of this invention. This polymerization process, per se, is known in the art.

In FIGURE 1, a series or train of polymerization reactors 10, 15, 20 and 25 are shown connected in series by conduits 12, 13 and 16. Although four reactors are illustrated in FIGURE 1 as being in series, it should be realized by those skilled in the art that the reactor train can be of any desired length. The number of reactors employed depends upon the optimum size of the reactors, desired residence time, and design capacity of the polymerization plant. It is frequently desirable to employ about 7 to 11 reactors in series for polymerization with three or four other reactors available for use in the event that one or more of the onstream reactors needs to be taken out of service. The reactors at the upstream end of the train are operated liquid-full, e.g., reactors 10 and 15 in FIGURE 1, and the last reactor or reactors, e.g., 20 and 25, are operated partially liquid-full and product is withdrawn from the reactor train from reactors 20 and 25 by way of lines 17, 18 and 19.

Reactors 10 and 15 as well as other upstream reactors in series (not shown) are maintained liquid-full by controlling the rate of effluent withdrawal from the last liquid-full reactor, e.g., reactor 15, through line 13 by means of pressure-recorder-controller 13a. The flow through line 13 is controlled by control valve 13b responsive to PRC–13a which senses the pressure in the last reactor in the train operated liquid-full.

A monomer stream comprising butadiene and styrene, for example, is introduced into the system at a constant flow rate through line 4, line 11, and then introduced into reactor 10 along with the remainder of the polymerization recipe. The remainder of the recipe is introduced into line 11 by way of lines 5 and 6. The flow of monomer(s) passed to reactor 10 is regulated by flow control valve 7a responsive to rate of flow controller 7. Similarly, soap or emulsifier solution (water) and the activators and modifiers (oxidant, etc.) are added at a constant rate through lines 5 and 6, respectively, and regulated by flow control valves 8a and 9a responsive to rate of flow controllers 8 and 9, respectively. Thus, the reactants and the remainder of the recipe are supplied to the initial reactor in the chain at a constant flow rate.

As shown in FIGURE 1, the reactants are introduced into the base of the initial reactor in the train by line 11 and the effluent is removed from the top of the upstream reactor and introduced into the base of the next reactor in the train. Thus, the upstream reactors in the train are operated liquid-full. The polymerization reaction proceeds as the reaction mixture is passed successively through each of the reactors in the train, the butadiene-styrene monomer mixture being incrementally converted to polymer in each of the reactors. Each of the reactors, including intermediate reactors not shown, are equipped with suitable heat exchange means, such as cooling coils, and/or jackets (not shown), agitation means, such as stirrers, and other conventional equipment.

According to the invention, the last operating reactor in the reactor train, i.e., either reactor 20 or 25, shown in FIGURE 1, is operated partially liquid-full and the effluent removed from the last reactor is controlled responsive to the liquid level in the respective reactors. The effluent from the last liquid-full reactor is passed by way of line 13 to the top of reactor 20. Reaction product is withdrawn from the base of reactor 20 through line 14 and is passed either to reactor 25 by way of line 16 or through lines 17 and 19 for recovery and further processing as desired. Reactor 20 is provided with a liquid level recorder-controller 23 which is operatively connected to control valve 24 in reactor effluent line 14. A signal representative of the actual liquid level in reactor 20 is compared by LRC–23 with a predetermined set desired liquid level that will provide a desired residence time for reactants in the reactor train and produce a reaction product mixture having the desired conversion of reactants to product. A signal representative of this comparison of the liquid level in reactor 20 and the predetermined set desired liquid level is transmitted to control valve 24 to either increase or decrease the rate of withdrawal of product from the reactor train and reactor 20. The predetermined set liquid level signal introduced into LRC–23 is adjusted or manipulated responsive to a conversion measurement as sensed by DRC–26 (density-recorder-controller). The degree of conversion of reaction product (polymer) in effluent line 19 is sensed by DRC–26 and compared with an input signal 27 which is representative of a predetermined set desired degree of conversion for product in line 19. A signal representative of this comparison made by DRC–26 is transmitted by way of lines 28, 30 and 31 to manipulate the set points of LRC–23 to call for a new liquid level in reactor 20 to regain the required residence time in the reactor train and achieve the desired or pre-set degree of conversion.

In the preceding description of FIGURE 1, it is presumed that adequate residence time (conversion) control can be effected with the last reactor only in the series. Further, according to the invention, in case liquid level control of reactor 20 cannot be carried out in such a manner that the residence time of reactants in the train of reactors is sufficient to provide the desired degree of conversion, reactor 25 is switched into the train as described hereinbelow to provide a greater residence time for the reactants.

Assuming additional residence time is required for reactants in the reactor train, i.e., the liquid level in reactor 20 is at the highest level controllable by LRC–23 and more residence time in the train is required, the effluent from reactor 20 is passed by way of lines 14 and 16 to the top of reactor 25. Reaction product from the reactor train is withdrawn from reactor 25 by way of lines 18 and 19. Reactor 25 is provided with a liquid level recorder-controller 21 which is operatively connected to flow control valve 22 in line 18. The rate of withdrawal of product from reactor 25 through line 18 is controlled by flow control valve 22 responsive to a signal from LRC–21 in a manner similar to that described in connection with LRC–23 and flow control valve 24 for reactor 20. A control signal is transmitted from LRC–21 to flow control valve 22 which is representative of a comparison of signals transmitted to LRC–21. LRC–21 compares an input signal representative of the measured liquid level in reactor 25 with a predetermined set desired input signal representative of the desired liquid level in reactor 25 to maintain a desired residence time and degree of conversion and produces an output signal representative of this comparison. The predetermined liquid level input signal to LRC–21 is adjusted or manipulated responsive to an output signal from DRC–26 by way of line 29. As discussed above with regard to set point manipulation of LRC–23, DRC–26 transmits a signal to LRC–21 and LRC–23 representative of a comparison of measured density (percent conversion) with desired density (or conversion) of reaction products in line 19. DRC–26 compares an input signal representative of the degree of conversion of product (density of solids) with an input signal representative of a desired predetermined set degree of conversion and produces an output signal representative of this comparison. By including reactor 25 in the reaction train, the residence time of reactants in the train can be increased, thereby increasing the conversion of feeds to reaction products. If the degree of conversion of product in line 19 rises above and continues to stay above the predetermined degree of conversion set by input signal 27 to DRC–26, the level in reactor 25 is lowered progressively to reduce residence time and consequently conversion, and if minimum level is reached without desired conversion being obtained, reactor 25 is switched out of the reactor train in a manner described below and control is effected in reactor 20 and product withdrawn therefrom.

The output signal from DRC–26 transmitted in line 28 can be an air pressure signal ranging from 3 to 15 p.s.i. LRC–21 can have an effective set point signal range of 9 to 15 p.s.i. with 9 p.s.i. being the zero setting and 15 p.s.i. being the full scale setting. Thus, LRC–21 is set-point-adjusted responsive to signals in line 29 ranging from 9 to 15 p.s.i. The output signal in line 28 from DRC–26 is also transmitted via lines 30 and 31 to LRC–23 which can have a zero set point of 3 p.s.i. and a full scale set point of 9 p.s.i. Thus, LRC–23 is adjusted when the output signal of DRC–26 ranges from 3 to 9 p.s.i. Split range control of instruments and/or control valves as described above is well known and can be effected in other ways depending upon the available equipment. The output signal from DRC–26 is also transmitted via line 37 to a trigger circuit unit 32 as is well known in electrical control art which actuates valve 17a through line 33 and valves 16a and 18a by way of lines 34 and 35, respectively. Valve 17a is normally closed and valves 16a and 18a are normally open, thus placing reactor 25 as the last operating reactor in the train. Responsive to a signal in line 30, say above 9 p.s.i., trigger circuit 32 performs no actuation of valves 16a, 17a and 18a so that the above-described normal positions are maintained. However, responsive to signals below 9 p.s.i. in line 30, valve 17a is opened and valves 16a and 18a are closed, thus placing reactor 20 as the last operating reactor in the train. As can be seen, this action is taken only after minimum level is reached in reactor 25.

The conversion as inferred from the density of the product stream in line 19 can be determined by any conventional type density measuring instrument such as the pressure hydrometer or gamma-ray absorption detector. The conventional gamma-ray absorption type density meter useful for the invention continuously measures the absorption of gamma rays as a function of the change in liquid density, said absorption increasing with an increase in density and absorption decreasing with a decrease in density. As indicated above in connection with FIGURE 1, density-recorder-controller 26 comprises a liquid stream density measuring device and its associated automatic process controller, the latter receiving the density measurement signal and a set point signal of desired density, produces an output signal which commands and executes the manipulation of the liquid level in reactors 20 and 25 through LRC-23 and LRC-21 to achieve that liquid level which will create that residence time required to maintain conversion at the desired value.

Although the drawing illustrates the polymerization reaction carried out in series reactors with the reactants introduced into the initial reactor in the train and product removed from the last operating reactor in the train, if desired, further amounts of polymerization catalyst, monomer(s), diluents and other additives can be occasionally, periodically or continuously added at intermediate points of the reactor train to increase, modify or otherwise alter the course of the polymerization reaction. It is also within the scope of the invention to determine the degree of conversion at any desired point in the train and manipulate residence time responsive to this measurement. Also, other methods of conversion and/or polymer concentration measurement, such as by employing physical properties (viscosity, for example) or computations based on heat or material balance, may be employed.

The reaction effluent from the last reactor, either reactor 20 or 25 in FIGURE 1, is withdrawn via line 19 and it is frequently desirable at this point to inject one or more additives to aid in the control of the polymerization and/or to improve the polymer product. For example, it is often desirable that polymerization cease after the effluent is withdrawn from the last reactor, and, for this purpose, a shortstop or catalyst inactivating agent can be added to the effluent stream 19 by suitable means (not shown). Another additive frequently injected into the effluent is an antioxidant which can be added at any desired point into conduit 19. The flow rates of these additives can be regulated and maintained substantially constant as desired.

Reference will now be made to FIGURE 2 wherein a solution process for the catalytic polymerization of butadiene to cis-1,4-polybutadiene is illustrated together with the novel features of this invention in accordance with another aspect of the control concept set forth herein. The polymerization process, per se, is well known to those skilled in this art.

In FIGURE 2 a series or train of polymerization reactors 50 and 60 are shown connected in series by conduit 44 and the effluent from the last liquid-full reactor (reactor 60) in the series is passed in parallel flow to two final reactors 70 and 80. Although only two series reactors, namely reactors 50 and 60, are shown in the drawing, it should be understood by those skilled in the art that any number of liquid-full reactors desired connected in series can be employed according to the invention. The number of reactors employed depends upon the optimum size of the reactors, the desired residence time, and the design capacity of the polymerization plant.

Monomer, e.g., butadiene, for the process is supplied by lines 40 and 43 and introduced into reactor 50 along with the remainder of the polymerization reaction mixture. Catalyst is introduced to the reactor through lines 41 and 43 and diluent by way of lines 42 and 43. A suitable diluent that can be introduced through line 42 is toluene. A suitable polymerization catalyst, e.g., an alkyl-aluminum and titanium tetrachloride, in solution in toluene, is introduced through line 41. The rate of flow of catalyst in line 41 is measured, controlled and manipulated by means of flow rate controller 45 and flow control valve 46, the rate of flow being maintained substantially constant by a set point established for flow rate controller 45. Similarly, rate of flow of monomer in line 40 is measured, controlled and manipulated by means of flow rate controller 47 and flow control valve 48. Diluent introduced through line 42 is controlled by flow rate controller 49 and flow control valve 51. The rate of flow of monomer and diluent being maintained substantially constant by a set point established for flow controllers 47 and 49, respectively. The resulting mixture of butadiene, toluene and catalyst components is introduced into reactor 50 by way of conduit 43. An iodine component can also be included in the catalyst mixture introduced through line 41 for the provision of an initiator mixture that will polymerize butadiene to a high cis-polybutadiene.

Reactors 50, 60, 70 and 80 are all provided with suitable means for agitating the reaction mixture and heat exchange means for removing the heat of reaction. The polymerization reaction proceeds as the reaction mixture is passed successively through each of the reactors in the train, the butadiene monomer being incrementally converted to polymer in each of the reactors. The reaction mixture is removed from the top of reactor 50 by way of line 44 and introduced into the base of reactor 60. If additional series liquid-full reactors are provided the effluent from each preceding reactor will be removed from the top of the reactor and introduced into the base of the following reactor is series so as to provide liquid-full operation for the upstream reactors in the series. The rate of flow of effluent from the last liquid-full reactor, reactor 60 in FIGURE 2, is controlled by flow control valve 54 responsive to pressure-recorder-controller 53 which senses the reactor pressure in the last liquid-full reactor in the series or train. The set point for PRC-53 is such that sufficient back pressure is provided on the effluent from the last liquid-full reactor to provide that all of the preceding upstream reactors operate liquid-full.

According to this embodiment of the invention, the effluent in line 52 removed from the last series liquid-full reactor is passed in parallel flow to reactors 70 and 80. The effluent introduced into the last operating reactors is controlled so as to introduce substantially equal amounts of reaction mixture into each of the equal volume parallel reactors (reactors 70 and 80). The rate of flow of reaction mixture introduced into reactor 80 by way of line 55 is controlled by flow control valve 56 in response to flow-recorder-controller 57. Flow-recorder-controller 57 is set so as to allow approximately one-half of the total flow in line 52 to be introduced into reactor 80. The remainder (one-half of flow in line 52) is introduced into reactor 70 and its rate of flow is controlled by way of flow control valve 58 in response to pressure-recorder-controller 59. PRC-59 senses the pressure in conduit 52 and, in response to a preset desired pressure, controls the introduction of reaction mixture into reactor 70 by regulating the position of valve 58.

Reactors 70 and 80 are provided with liquid level recorder-controllers 61 and 62, respectively. These liquid level recorder-controllers receive input signals representative of the liquid level in reactors 70 and 80 and input signals representative of a set predetermined signal representative of a desired liquid level and produces an output signal representative of this comparison. LRC-61 is operatively connected to flow control valve 63 in effluent line 65 for removal of product from the base of reactor 70 and LRC-62 is operatively connected to flow control valve 64 in effluent line 66 for removal of product from the base of reactor 80. The effluent removed from reactors 70 and 80 by way of lines 65 and 66, respectively, is combined and removed from the process by way of line 67.

The degree of conversion of monomer to the product withdrawn in line 67 from the reactor train is determined by density-recorder-controller 68 which can be advantageously calibrated to convert an input signal representative of density (percent solids) directly into terms of percent conversion. An input signal representative of a predetermined desired density (degree of conversion) is provided by set point 69 to DRC-68. DRC-68 compares a signal representative of the actual percent solids of product in line 67 with a predetermined desired percent solids (set point 69) and produces an output signal related to the difference above or below the desired percent solids. The output signal from DRC-68 is transmitted by way of lines 71 and 72 to LRC-61 and LRC-62, respectively, to adjust the liquid level in reactors 70 and 80 and thereby manipulate the residence time so as to control conversion at a desired level or value. Assuming that the density of the product-containing stream falls below set point 69, DRC-68 resets LRC-61 and LRC-62 so as to increase the liquid level in reactors 70 and 80 and thereby increase residence time in the reactor train and hence increase the percent solids (percent conversion) so as to return the degree of conversion to the predetermined value set by input signal to DRC-68. In response to signals from DRC-68 calling for a higher set point or liquid level in reactors 70 and 80, LRC-61 and LRC-62 decrease the rate of product withdrawal from the base of reactors 70 and 80 by moving valves 63 and 64 toward the closed position. If, however, the percent solids of product in line 67 rises above and continues to stay above the set point 69, signals representative of this error are transmitted to LRC-61 and LRC-62 to adjust the predetermined liquid level to a lower value and at the same time releases product stream at a greater rate from the base of reactors 70 and 80 by moving valves 63 and 64 toward the full open position, thus returning the percent solids (degree of conversion) to a predetermined value (set point 69).

As described in connection with FIGURE 1, if desired, one or more additives which aid in the control of the polymerization and/or improve the polymer product can be introduced into the reaction effluent in conduit 67. Also, if desired, further amounts of polymerization catalyst, monomer and solvent, can be occasionally or periodically added to intermediate points in the reactor train to adjust certain characteristics of the polymerization reaction. Similarly, the degree of conversion in one or more reactors in the train can be used to adjust the liquid level controllers in the last reactors and maintain the desired residence time.

The instant invention has found particular applicability for the control of the residence time and hence the degree of conversion in catalytically promoted reactions such as catalytic polymerization reactions or catalytic hydrocarbon conversion reactions where the residence time of reactants in a reactor chain affect the degree of conversion. While the invention can be applied broadly to the control of reactions wherein a component is only partially converted to the end product, it is of special importance in the control of polymerization reactions, for example, in the catalytic polymerization of olefins, to normally solid polymers. The invention is also especially useful in the catalytic polymerization of conjugated dienes containing from 4 to 12 carbon atoms to produce rubbery polymers, both in emulsion systems and solution systems. Examples of these conjugated dienes include 1,3-butadiene, isoprene, piperylene, 2-methyl-1,3-pentadiene, and the like. These monomers can be formed into homopolymers or copolymerized with each other or with other monomers containing a vinylidene group such as aliphatic 1-olefins, containing up to 8 carbon atoms per molecule, styrene, various alkyl styrenes, heterocyclic nitrogen-containing monomers, such as 2-methyl-5-vinylpyridine, and the like.

Various catalyst or initiator systems known to those skilled in the art can be used in connection with the polymerization of the above-named conjugated dienes since solution or bulk systems can be employed. Known catalyst compositions that can be employed for the polymerization of butadiene, for example, to high cis-polybutadiene include mixtures of titanium tetrachloride and triethylaluminum, a mixture of titanium tetrachloride and tripropylaluminum, a mixture of triisobutylaluminum, titanium tetrachloride and iodine, mixtures of triisobutylaluminum, titanium tetrachloride and titanium tetraiodide, and the like. Emulsion polymerization can be carried out with conventional known recipes for the production of rubbery polymers from butadiene and styrene, as well as other monomers.

The temperature of the polymerization ordinarily does not exceed 300° F. and is more frequently within the range of about −60 to 120° F. for the polymerization of conjugated dienes. In the formation of cis-1,4-polybutadiene, for example, temperatures within the range 10 to 100° F. are preferred. Polymerizations carried out under solution conditions ordinarily employ or require the presence of a diluent or solvent. Suitable diluents for solution polymerization processes are the paraffins and cycloparaffins and/or aromatic hydrocarbons which are relatively inert, non-deleterious and liquid under the conditions of the process.

The degree of conversion of monomer to polymer depends upon the activity of the catalyst, temperature of the reaction, residence time of the reaction mixture, and the like. As indicated previously, a preferred operating temperature for the polymerization of 1,3-butadiene is in the range of about 10 to 100° F. Ordinarily, the conversion to approximately 60 percent in such a reaction and when a series of reactors are employed, as shown in FIGURES 1 and 2, most of the conversion takes place in the first few reactors. For this reason, it is often desirable to maintain the temperature of the first reactors of the train somewhat below the average temperature maintained in the downstream reactors. In this manner, better balance of the heat removal load is obtained and it is easier to keep the polymerization reaction under control.

SPECIFIC EXAMPLE

In this example, the polymerization of butadiene and styrene in an emulsion system utilizing a train of 12 reactors operated in series as illustrated in FIGURE 1 will be described. A monomer mixture of butadiene and styrene is introduced at a constant rate through line 4 along with a conventional recipe including soap or emulsifier solution, activators and modifiers introduced by lines 5 and 6 at a constant rate to the first reactor in the battery. The total residence time within the reactor train is 8.4 hours and a total conversion of butadiene and styrene to butadiene-styrene rubbery copolymer is 59.0 percent. Reactor temperatures are held at 41° F. in the first three reactors (first stage), 42 to 44° F. in the next three reactors (second stage) and 45° F. in the last six reactors (third and fourth stages). Reactor pressure in reactors 10 and 15 is about 50 p.s.i.a.

Polymerization is initiated in reactor 10 and the effluent from this first stage (reactor 10) enters the second stage (reactor 15) where additional polymerization is effected.

The effluent from reactor 15 is passed to the third stage (reactor 20) where additional polymerization is effected, reactor 20 being operated at maximum level at this time. PRC–13a is set at 50 p.s.i.a. to maintain reactors 10 and 15 liquid-full. Reactors 20 and 25 operate at emulsion vapor pressure, about 25 p.s.i.a. at normal operating temperatures. The effluent from reactor 20 is passed to the fourth stage (reactor 25) which is partially liquid-full and is being liquid level controlled. The reaction effluent from the reactor train is removed by line 19 and the density (percent solids) of the polymer-containing emulsion in line 19 is sensed by a gamma-ray absorption unit and a signal representative of the density is transmitted within DRC–26. An input signal representative of a predetermined desired conversion or percent solids in line 19 is introduced by set point 27 on DRC–26. As the measured percent solids or density of the product stream varies from this predetermined desired value, DRC–26 transmits a signal by way of lines 28 and 29 manipulating the set point of LRC–21 and adjusting the liquid level and residence time in reactor 25 responsive to a comparison made within DRC–26 so as to return the degree of conversion to the predetermined value set by input signal 27. As the result of this control manipulation, total residence time within the reaction train varies between 7.6 and 8.4 hours as required to bring about 59 percent conversion of monomers to polymer.

By the practice of the invention, rapid corrections are made with regard to the liquid level in the last operating reactor(s) responsive to changes in the percent solids or density of reaction product removed from the last reactor. By the practice of the invention, relatively constant final conversion of product for a predetermined residence time is achieved in a direct manner.

Various modifications and alterations of this invention will become apparent to those skilled in the art without departing from the scope and spirit of this invention and it should be understood that the foregoing discussion should not be construed to limit unduly the subject invention.

I claim:

1. A method for controlling conversion in a plurality of reactors operated in series wherein (1) reactants are continuously fed at a constant rate to the first reactor in the series, (2) the upstream reactors in the series are operated liquid-full, (3) the last reactor in the series is operated partially liquid-full, and (4) product is withdrawn from the last reactor in the series, which comprises:
   measuring the liquid level in the last reactor in said series and producing a control signal related thereto; and
   controlling the rate of withdrawal of product from said last reactor in said series responsive to changes in said control signal by reducing the rate of product withdrawal when the liquid level in said last reactor falls below a predetermined level so as to increase the residence time, and thereby conversion, of the reactants in said reactor train and increasing the rate of product withdrawal when said liquid level rises above a predetermined level so as to decrease the residence time, and thus conversion, of the reactants in said reactor train.

2. A method according to claim 1 including the steps of:
   determining the degree of conversion of reactants in said reactor train and producing a second control signal proportional thereto; and
   adjusting said predetermined liquid level responsive to changes in said second signal so as to maintain a constant final conversion in said reactor train.

3. A process for controlling conversion of a polymerization reaction carried out in a plurality of reactors operated in series which comprises:
   continuously passing reactants at a constant flow rate to the first reactor in said series;
   passing reaction effluent from each reactor in said series to the next succeeding reactor;
   withdrawing reaction product from the last operating reactor in said series;
   maintaining the last reactor in said series partially liquid full;
   maintaining the remainder of the reactors in said series liquid-full by controlling the rate of flow of reaction effluent passed from the last liquid-full reactor to the partially-filled reactor responsive to pressure in the last liquid-full reactor;
   continuously determining the liquid level in said last reactor and comparing same with a predetermined desired liquid level and producing a control signal proportional thereto; and
   controlling the rate of withdrawal of product from said last reactor responsive to changes in said latter signal so as to control residence time of reactants in said reactor train, and hence conversion, at substantially a constant value.

4. A method according to claim 3 including the steps of:
   continuously analyzing the effluent removed from said last reactor to determine the percent solids therein and producing a second control signal proportional thereto;
   comparing said second control signal with a third signal proportional to a predetermined desired percent solids in the product effluent stream removed from said last reactor and producing a fourth control signal proportional thereto; and
   adjusting said predetermined liquid level responsive to changes in said fourth control signal by increasing the liquid level in the last reactor when the conversion falls below said predetermined conversion value and decreasing said predetermined liquid level when the measured conversion rises above said predetermined conversion value.

5. The process for controlling the conversion level of a polymerization reaction carried out in a plurality of reactors operated in series which comprises:
   continuously passing reaction effluent from each reactor in said series to the next succeeding reactor;
   withdrawing reaction product from the last operating reactor in said series;
   maintaining the last two reactors in said series partially liquid-full and the remainder of said reactors liquid-full;
   continuously determining the liquid level in said last two reactors and comparing said determined liquid level with a predetermined desired liquid level and producing a first control signal proportional thereto;
   continuously determining the degree of conversion by analyzing the effluent from said last operating reactor to obtain the degree of conversion (percent solids) of reactants during polymerization and producing a second control signal proportional thereto;
   comparing said second control signal with a signal proportional to a predetermined desired conversion level and producing a third control signal proportional thereto;
   resetting said predetermined liquid level in said two reactors responsive to changes in said third control signal by increasing the liquid level and thereby residence time when said conversion falls below said predetermined minimum value and decreasing the liquid level and thereby residence time when said conversion rises above said predetermined minimum value;
   controlling the withdrawal of product from said train from the last two reactors responsive to a predetermined liquid level in said last two reactors so as to regulate the residence time of reactants in said train, said product being withdrawn from (1) the last reactor in the train when the measured conversion falls below and continues below said predetermined value, thus increasing residence time, and (2) the next to last reactor when the measured conversion rises above and continues to remain above said predetermined conversion value, thus decreasing residence time; and resetting said predetermined liquid level in said liquid level controlled reactors and switching the removal of product from said last two reactors in said train responsive to changes in said third control signal by flowing effluent from the next to last reactor to the last reactor and controlling product withdrawal in the last reactor when said measured conversion falls below said predetermined value and blocking off flow to the last reactor and removing product from the next to last reactor when said measured conversion continues below said predetermined value.

6. The process for controlling the conversion level of a polymerization reaction carried out in a plurality of reactors operated in series except the last two reactors which comprises:

continuously feeding reactants to the first reactor in said series;

continuously passing reaction effluent from each reactor in said series operated liquid-full to the next succeeding liquid-full reactor;

flowing effluent from the last liquid-full reactor in the series to two final reactors operated in parallel;

proportioning the flow equally to said last two parallel reactors;

withdrawing reaction product from the said last two operating reactors in said series;

measuring the liquid level in each of said last two reactors and producing a first control signal proportional thereto;

comparing the measured liquid level with a predetermined desired liquid level adapted to produce a desired rate of conversion and residence time and producing a second control signal proportional thereto;

controlling the rate of withdrawal of product from each of said reactors responsive to said second control signal by increasing the rate of withdrawal when said measured conversion increases above said predetermined value, thus decreasing residence time and conversion, and decreasing the rate of withdrawal of product as said measured conversion falls below said predetermined conversion value;

measuring the conversion of product in the product withdrawal stream and comparing same with said predetermined desired conversion value and producing a control signal proportional thereto; and resetting the predetermined liquid level in said last two reactors responsive to said latter control signal so as to control the conversion at a constant predetermined value.

8. In a continuous exothermic process wherein a chemical reaction is carried out in a plurality of reactors operated in series, the first reactor in said series being provided with conduit means to supply a reactant feed thereto, the last reactor in said series being provided with conduit means for withdrawal of reaction product therefrom, the remainder of the reactors in said series being interconnected so that effluent flows from one reactor to the next succeeding reactor; a control system for controlling the rate of conversion and residence time in said series of reactors comprising, in combination:

a first control valve means in the effluent line from the last liquid-full reactor operatively connected to a pressure controller which senses the pressure in the last liquid-full reactor adapted to control the rate of withdrawal of effluent from the last liquid-full reactor and maintain all of the reactors preceding said last liquid-full reactor liquid-full;

liquid level means on said last reactor in said series;

control valve means connected to said liquid level control means in the product withdrawal line from said last reactor, said liquid level control means and said control valve means being adapted to control the rate of wthdrawal of product from said last reactor responsive to changes in the liquid level so as to maintain a predetermined conversion rate and residence time in said reactor chain.

9. The apparatus of claim 8 including:

analyzing and control means connected to the product withdrawal line from said last reactor adapted to measure the rate of conversion (percent solids) of the reaction product in said withdrawal line and produce a control signal representative thereof;

means to compare said measured conversion signal with a predetermined set signal and producing a control signal representative thereof; and means for manipulating said liquid level controller responsive to changes in said compared signal, said conversion controller being operatively connected to said liquid level controller.

10. The apparatus of claim 8 which includes the following:

liquid level controlling means operatively connected to the last two reactors in said series;

product wthdrawal conduits from the last two reactors in said series;

first and second control valve means connected to said product withdrawal conduits and operatively connected to the liquid level controller operatively connected to the respective reactors;

analyzing and control means operatively connected to a product withdrawal conduit from said last two reactors adapted to measure the rate of conversion (percent solids) of product in the withdrawal conduit;

means to compare said measured rate of conversion with a predetermined desired rate of conversion and being further adapted to produce a control signal proportional thereto, said latter means being operatively connected to each of said liquid level controllers on said last two reactors;

triggering means operatively connected to said conversion measuring and control means adapted to receive the output signal from said conversion control means and produce an output signal; and valve means positioned in said withdrawal conduits from said last two reactors operatively connected to said triggering means and being adapted to switch product withdrawal from the last reactor in the series when the conversion falls below a predetermined value and remove product from the next to last reactor when the conversion rises above a predetermined value.

11. In a continuous exothermic process wherein a chemical reaction is carried out in a plurality of reactors operated in series followed by two reactors operated in parallel, reactant feed being passed to the first reactor in said series, product withdrawal being withdrawn from the last operating reactor in the series, means for transferring effluent from the top of one liquid-full reactor to the base of the next succeeding liquid-full reactor, means for transferring effluent from the top of the last liquid-full reactor to the top of the last two parallel partially-filled reactors, a control system for controlling the residence time and conversion rate in the reactor train which comprises, in combination:

control valve means in the effluent line from the last liquid-full reactor connected to a pressure controller adapted to maintain the last liquid-full reactor and all of the preceding upstream reactors liquid-full;

flow control valve means and flow controller means operatively connected to the inlet conduit to the last parallel reactors adapted to proportion the flow of reactant equally to the last two reactors;

liquid level controllers operatively connected to the last two reactors in said series;

control valve means operatively connected to said liquid level controllers in the withdrawal conduit from the respective reactors, said liquid level controller being adapted to control the rate of withdrawal of product from said respective reactors responsive to changes in the liquid level in each of said reactors so as to maintain a desired residence time of reactants in the train;

measuring and control means operatively connected to the withdrawal conduit adapted to determine the rate of conversion of product in the withdrawal conduit and being further adapted to compare the measured rate of conversion with a predetermined desired conversion rate and produce a control output signal proportional thereto; and means connecting said conversion measuring and control means with each of said liquid level controller means so as to manipulate said predetermined liquid level responsive to changes in said compared conversion rate so as to increase the rate of product withdrawal when the measured conversion rate rises above the predetermined desired conversion level and decrease the rate of product withdrawal when the measured conversion rate falls below the predetermined desired conversion rate so as to control reactant residence time in the reactor chain, and hence conversion.

References Cited by the Examiner

UNITED STATES PATENTS 2,886,616  5/1959  Mertz et al. _____ 23—253 X
2,897,247  7/1959  Marak _____ 23—253 X MORRIS O. WOLK, *Primary Examiner.*

JAMES H. TAYMAN, JR., *Examiner.*